B. M. CRAWFORD.
HONEY EXTRACTOR.
APPLICATION FILED MAY 20, 1920.
1,392,679. Patented Oct. 4, 1921.
2 SHEETS—SHEET 1.
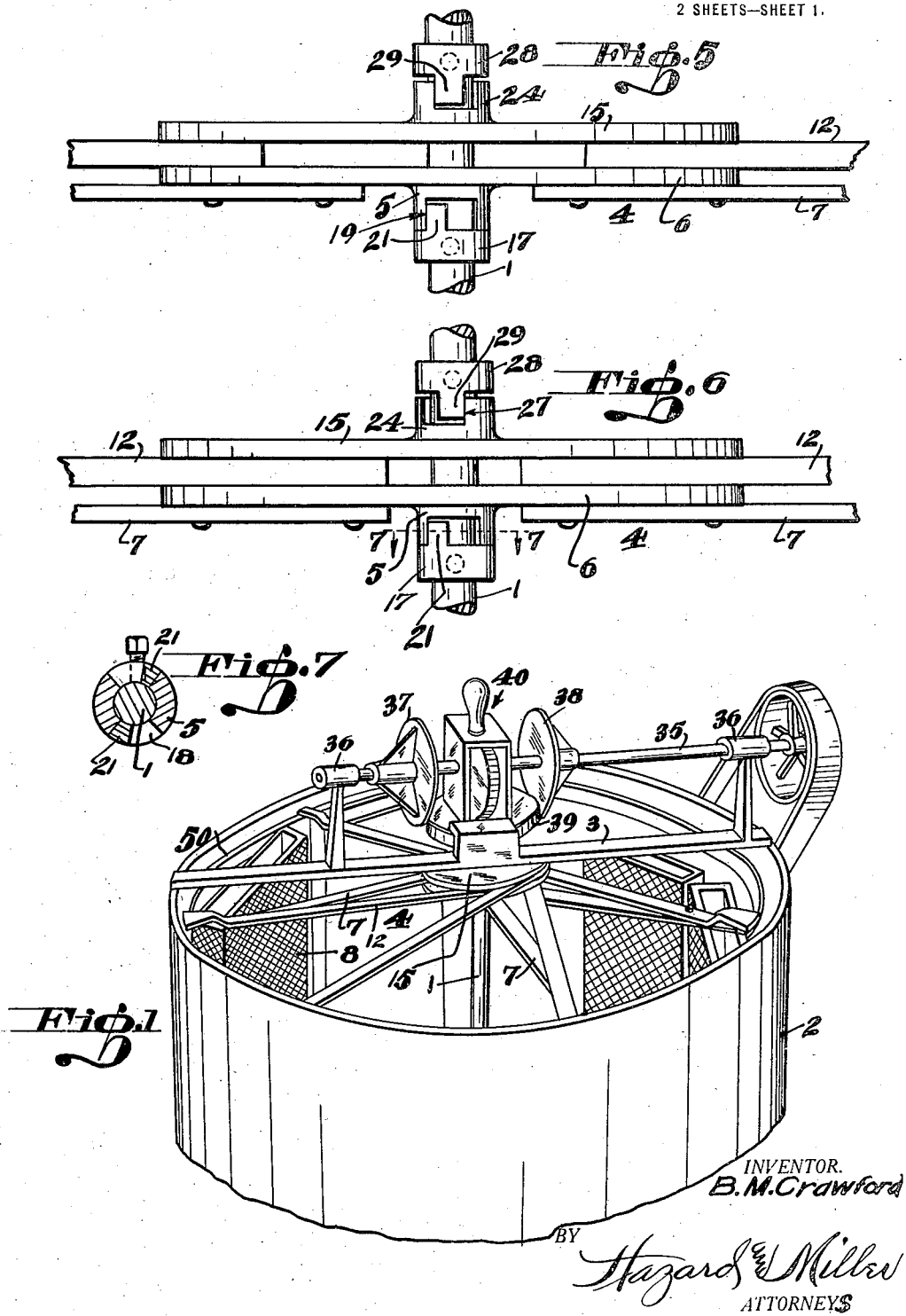
INVENTOR.
B. M. Crawford
BY
Hazard & Miller
ATTORNEYS

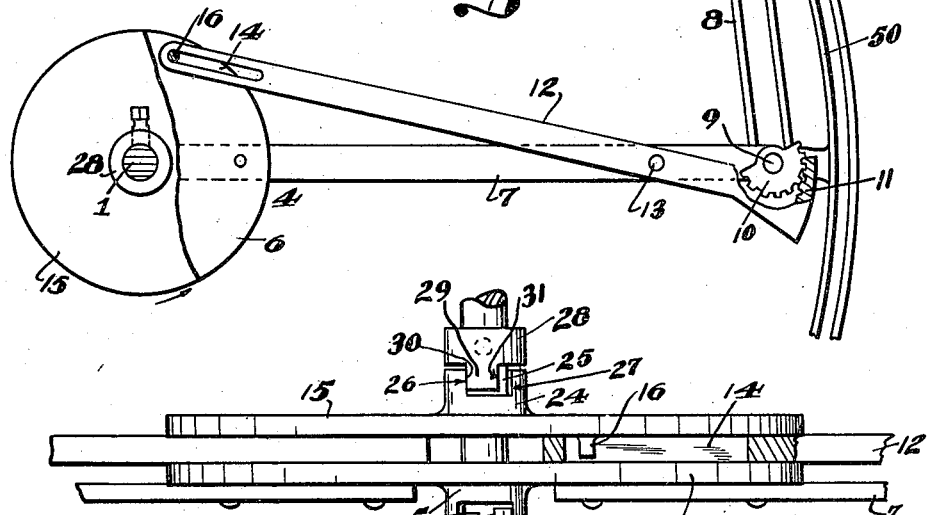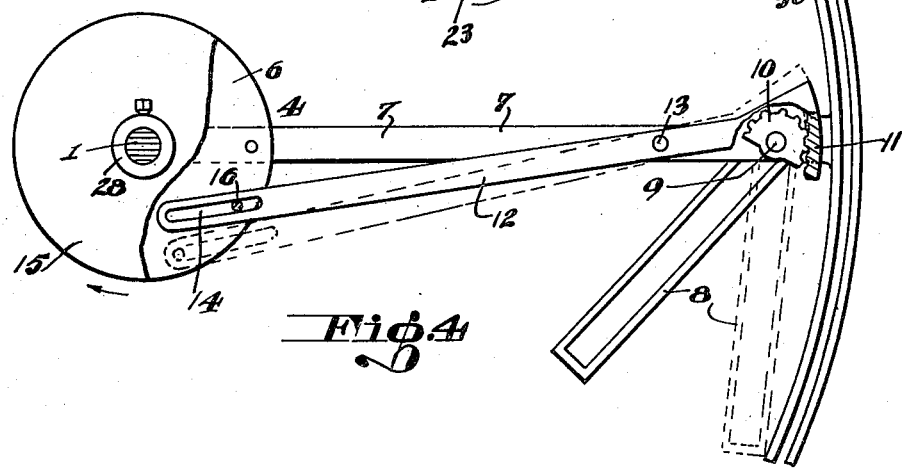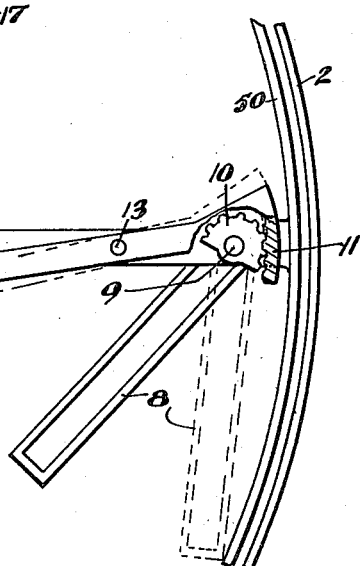

UNITED STATES PATENT OFFICE.

BEATTY M. CRAWFORD, OF SANTA ANA, CALIFORNIA, ASSIGNOR TO VICTOR V. KUNKEL, OF LOS ANGELES, CALIFORNIA.

HONEY-EXTRACTOR.

1,392,679.  Specification of Letters Patent.  Patented Oct. 4, 1921.

Application filed May 20, 1920. Serial No. 382,768.

*To all whom it may concern:*

Be it known that I, BEATTY M. CRAWFORD, a citizen of the United States, residing at Santa Ana, in the county of Orange and State of California, have invented new and useful Improvements in Honey-Extractors, of which the following is a specification.

My invention is an apparatus for extracting honey syrup from combs and is an improvement over my apparatus embodied in my application filed January 2, 1920, Serial No. 349,000.

My apparatus consists in the provision of means for positively effecting only part of the reversing movement of the honey-comb carriers and allowing the carriers to complete their reversing movement by centrifugal force, thus preventing the carriers from being brought to a sudden stop and breaking and throwing the combs out of the carriers at the end of their reversing movement.

Referring to the annexed drawings which form a part of this specification:

Figure 1 is a perspective view of a machine embodying my invention for extracting honey.

Fig. 2 is a plan view of my invention.

Fig. 3 is an enlarged fragmentary elevation of my invention with the parts in the position corresponding to the position of the parts in Fig. 2.

Fig. 4 is a plan view of my invention showing the parts in full lines partly reversed and in dotted lines completely reversed.

Fig. 5 is an enlarged fragmentary elevation of my invention showing the parts partly reversed.

Fig. 6 is an enlarged fragmentary elevation of my invention showing the parts completely reversed.

Fig. 7 is a section on the line 7—7 of Fig. 6.

In the drawings 1 indicates a vertical shaft suitably journaled in a tank 2 at its upper end in a bearing (not shown) on a frame 3 secured to the top of the tank, and at its lower end in a bearing (not shown) in the bottom of said tank. On the shaft 1, within the tank 2, is rotatively mounted a reel 4 which includes a hub 5 rotatively mounted on said shaft near the upper end thereof. A disk 6 is secured on said hub, and a plurality of radial arms 7 secured to said disk. On the reel 4 adjacent the wall of the tank 2 are pivotally mounted the plurality of honey-comb carriers 8, the upper end of said carriers being pivoted by pivots 9 to the outer end of the radial arms 7. On the pivots 9 above the arms 7 are secured segmental pinions 10 which mesh with segmental gears 11 on the outer end of the levers 12 pivoted on the upper side of the arms 7 by pivots 13, the inner end of which levers extend over the upper face of the disk 6 and are provided with longitudinal slots 14. A disk 15 is rotatively mounted on the shaft 1 above the levers 12 and disk 6, said disk resting upon said levers. Pins 16 depend from the lower side of the disk 15 into the slots 14 in the inner end of the levers 12. A collar 17 is secured on the shaft 1 below the hub 5 upon which collar said hub rests and turns. The hub 5 is provided with a recess in its lower edge having side engaging edges 19 and 20. On the collar 17 is an upstanding lug 21 which projects into the recess 18 and has side engaging edges 22 and 23 for engaging the side edges 19 and 20 respectively of the recess 18. The disk 15 has a hub 24 on its upper side provided with a recess 25 having side engaging edges 26 and 27. On the shaft 1 above the hub 24 is secured a collar 28 which has a lug 29 depending therefrom into the recess 25, said lug having engaging side edges 30 and 31 for respectively engaging the side edges 26 and 27 of the recess 25.

The shaft 1 may be driven and reversed by any suitable means such as shown in Fig. 7. In said figure I have shown a drive shaft 35 journaled in bearings 36 upstanding from the frame 3, on which shaft are secured slidable friction disks 37 and 38 for alternately engaging a friction wheel 39 secured on the upper end of the shaft 1, a shifting mechanism 40, such as disclosed in my application above mentioned, being provided for automatically or manually shifting said disks 37 or 38 alternately in engagement with the friction wheel 39.

The operation of my invention is as follows: When the shaft 1 is rotated in a counter clockwise direction the parts are in the position shown in Figs. 2 and 3. When the rotation of the shaft 1 is reversed the lug 21 is rotated from the right to the left side of the recess 18 and the edge 22 of said lug engages the edge 19 of said recess 18 of reel hub 5 and rotates the reel 4 in a clockwise direction as shown in Fig. 5. While the lug 21 is rotated from the right to the left side of the recess 18, the edge 30 of the lug 29 engages the edge 26 of recess 25 and rotates the disk 15 in a clockwise direction with relation to the shaft 1 until the pins 16 engaging slots 14 swing the levers 12 on their pivots 13 and the segments 11 engaging the pinions 10 partly reverse the honey-comb carriers 8 to the position as shown in full lines in Fig. 4. The reel 4 and the disk 15 are then rotated in a clockwise direction while the honey-comb carriers 8 swing outwardly into engagement with the vertical wall of the tank 2 under the influence of centrifugal force, thus completing the reversing movement shown in dotted lines in Fig. 4. While the honey-comb carriers 8 complete their reversing movement under the influence of centrifugal force, the disk 15 through the segmental gears 11, segmental pinions 10, levers 12, slots 14, and pins 16, is rotated ahead of the shaft 1 in a clockwise direction until the edge 27 of the recess 25 engages the edge 31 of the lug 29 as shown in Fig. 6.

Upon reversing the shaft 1 into a counter clockwise direction the lug 21 first rotates from the left to the right side of the recess 18 and then the edge 23 of said lug engages the edge 20 of said recess and rotates the reel 4 with the shaft 1 as shown in Fig. 3. While the lug 21 is rotated from the left to the right side of the recess 18 the edge 31 of the lug 29 engaging the edge 27 of the recess 25 rotates the disk 15 in a counter clockwise direction until the honey-comb carriers are partly reversed through the medium of the pins 16, slots 14, levers 12, segmental gears 11 and segmental pinions 10. The reel and the disk 15 are then rotated with the shaft 1 and the honey-comb carriers 8 are completely reversed under the influence of centrifugal force into the position shown in Fig. 2, during which latter reversing movement of the honey-comb carriers 8, the disk 15 through the segmental pinions 10, segmental gears 11, levers 12, slots 14 and pins 16, is rotated ahead of the shaft 1 in a counter clockwise direction until the recess edge 26 engages the edge 30 of the lug 29 as shown in Fig. 3.

By reversing the honey-comb carriers only partly by the positive action of the apparatus and allowing the honey-comb carriers to be completely reversed by the action of centrifugal force the carriers are not brought to a sudden stop or thrown against the ring 50 of the reel 4 with any great force, thus preventing the honey-comb and the carriers from being broken.

It will be apparent that various changes may be made in the construction as thus described without departing from the spirit of the invention.

What is claimed is:

1. In a centrifugal honey extractor, a shaft, a reel on said shaft, honey-comb carriers mounted on said reel, means for automatically partly reversing said honey-comb carriers when said shaft is reversed and for allowing said honey-comb carriers to complete their reversing movement under the influence of centrifugal force.

2. In a centrifugal honey extractor, a shaft, a reel rotatively mounted on said shaft, honey-comb carriers mounted on said reel, the hub of said reel being provided with a recess at one end, a collar secured on said shaft, a lug on said collar extending into said recess for alternately engaging the side edges of said recess, said recess being somewhat wider than said lug, a disk rotatively mounted on said shaft, the hub of said disk having a recess in one end, a collar secured on said shaft, a lug on said collar extending into the recess in said disk hub, the recess in said disk hub being slightly wider than the lug on said latter collar, and means actuated by said disk when the shaft is reversed for partly reversing said honey-comb carriers and for allowing said honey-comb carriers to complete their reversing movement under the influence of centrifugal force.

In testimony whereof I have signed my name to this specification.

BEATTY M. CRAWFORD.